Jan. 27, 1959 H. VERMETTE 2,870,535
PIPE CUTTERS
Filed Aug. 24, 1956 5 Sheets-Sheet 1

INVENTOR.
HOWARD VERMETTE
BY
Harry H. Hitzeman
ATTORNEY.

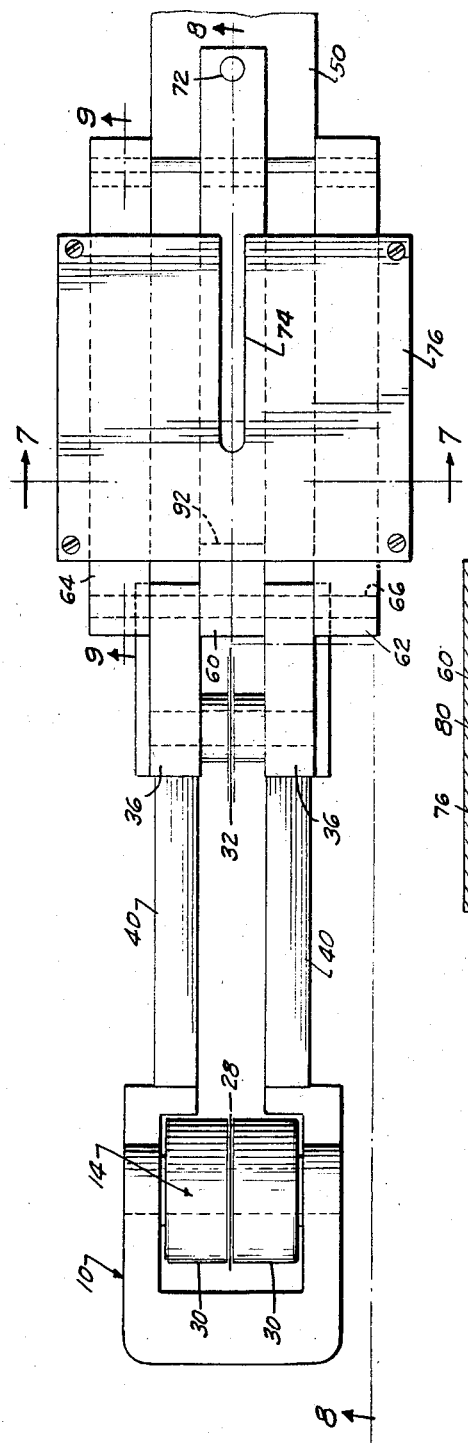
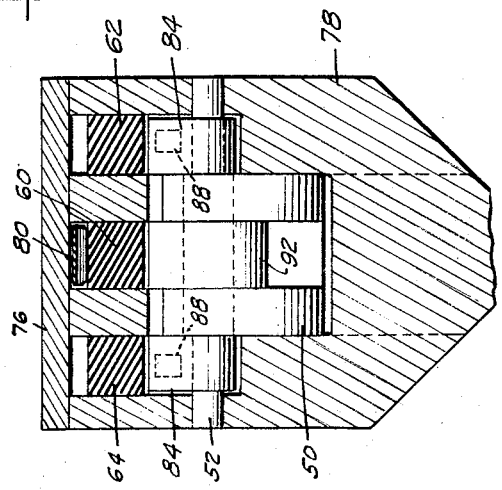

Jan. 27, 1959
H. VERMETTE
2,870,535
PIPE CUTTERS
Filed Aug. 24, 1956
5 Sheets-Sheet 3
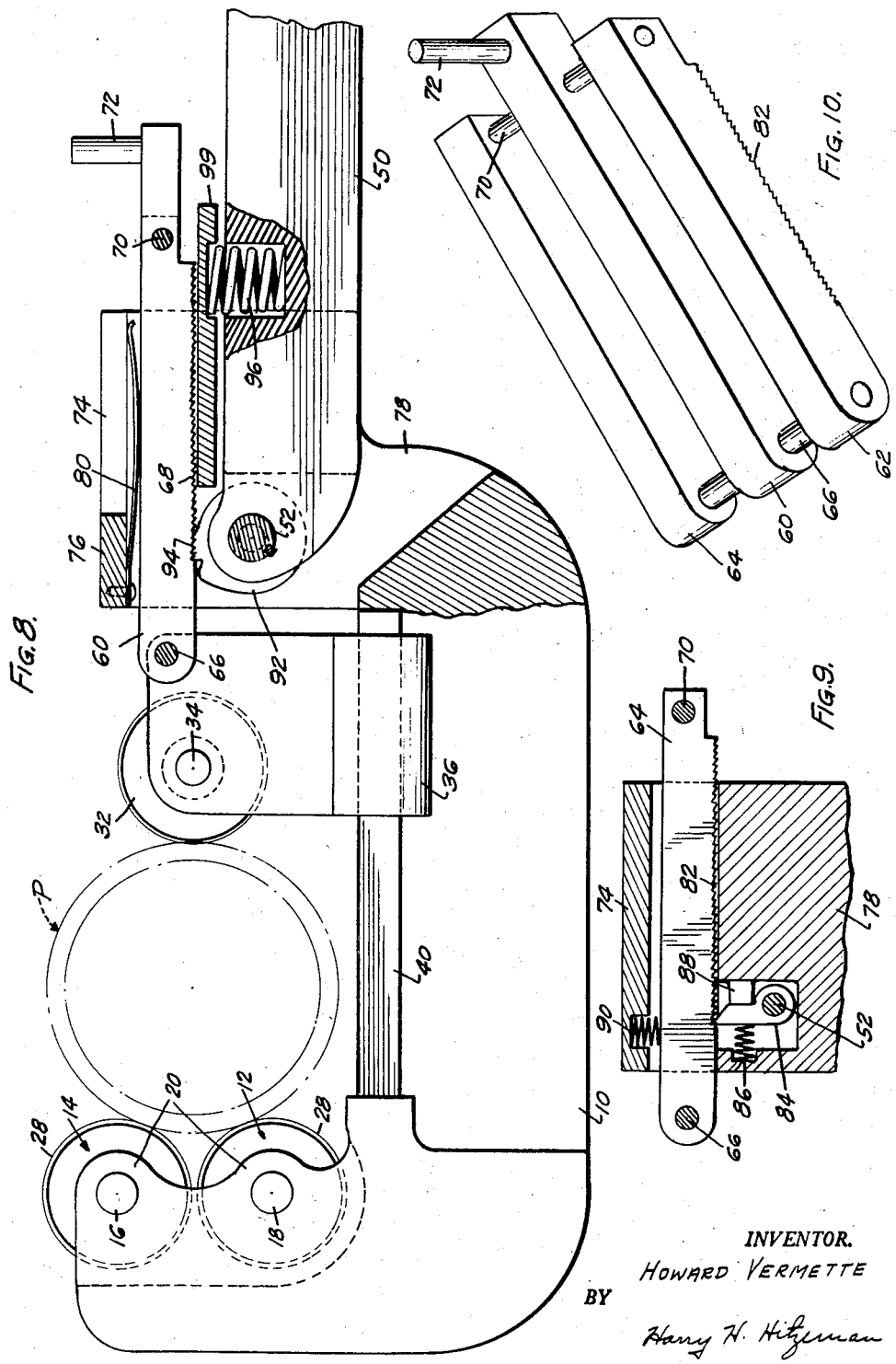
INVENTOR.
HOWARD VERMETTE
BY
Harry H. Hitzeman
ATTORNEY.

Jan. 27, 1959  H. VERMETTE  2,870,535
PIPE CUTTERS
Filed Aug. 24, 1956  5 Sheets-Sheet 4
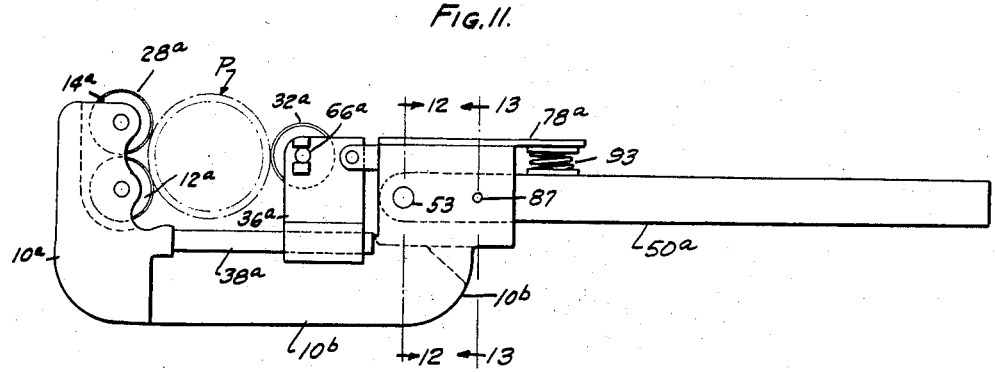
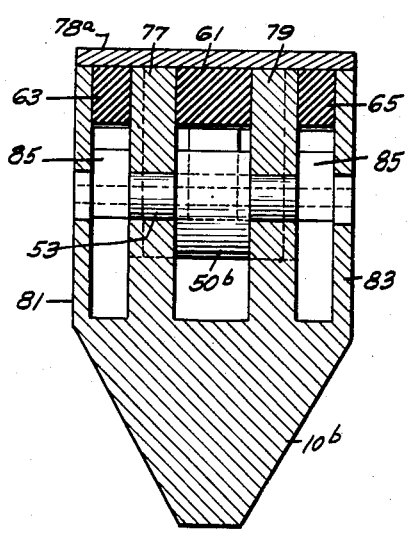
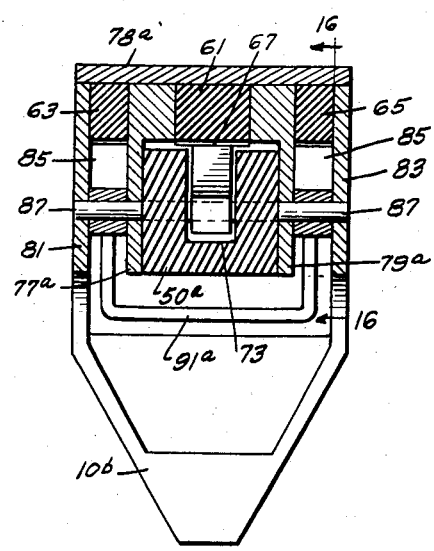
INVENTOR
HOWARD VERMETTE
BY Harry H. Hitzeman
ATTORNEY

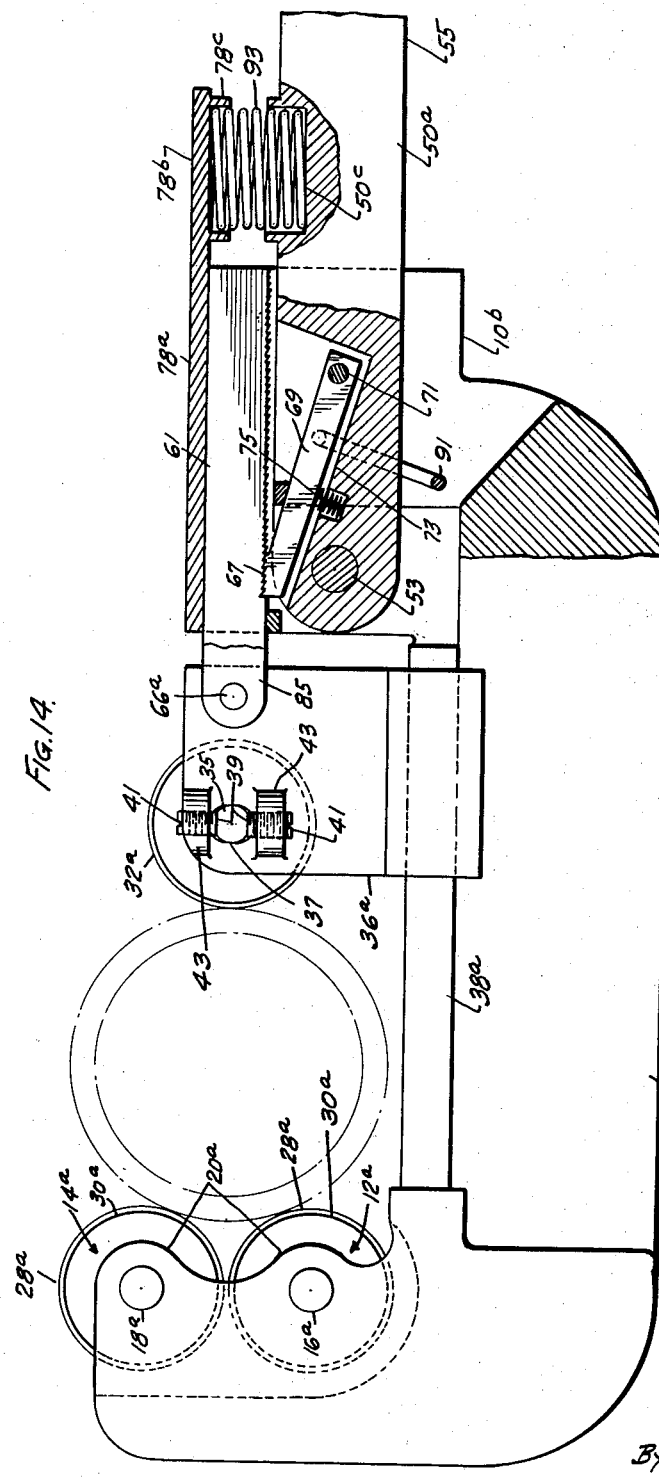
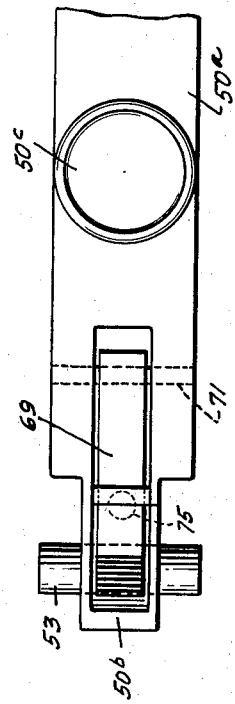
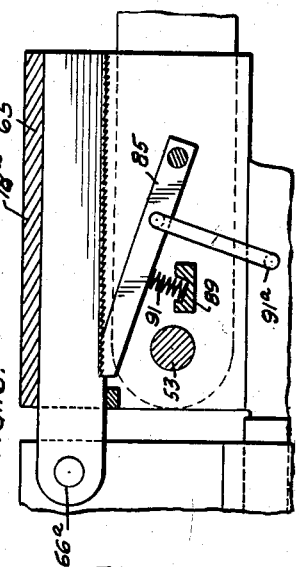

United States Patent Office 2,870,535
Patented Jan. 27, 1959

2,870,535

PIPE CUTTERS

Howard Vermette, Hammond, Ind.

Application August 24, 1956, Serial No. 606,110

12 Claims. (Cl. 30—102)

My invention relates to pipe cutters and similar devices.

My invention relates more particularly to pipe, rod or tube cutters of the type commonly used by plumbers and electricians for cutting pipe or tubing on the job, either by hand or with a power driven chuck.

One of the objects of my invention is to provide in mechanism of the type described an improved wheel and roller tube or pipe cutter. Cutters of this type have a tendency to spiral instead of tracking over the first impression of the cutting wheel. Often when a cutter is allowed to spiral, the frame of the tool is permanently bent and the problem is aggravated. My invention incorporates a number of improvements to overcome this difficulty and even provides for realignment if by some unfortunate accident the frame is sprung or bent.

Spiraling is more frequently experienced on larger diameter pipe than on the smaller sizes. This is because of the greater circumference and the greater distance the cutter wheel must travel to re-enter the start of its cut. Three-wheel cutters have divided this distance by three and greatly reduced the possibility of spiraling, but they also cause a burr that makes it difficult to start a die. When rollers replace two of the wheels, the burr is pressed down and assists in parting the pipe. In my invention, combination rollers and wheels are used in two positions and a cut-off wheel in the third position. The projections on the rollers will not part the pipe because they are only high enough to assist in tracking. This allows the roller to contact the pipe and flatten the burr before final parting is completed.

Another important feature of my invention is the replacement of the commonly used feed screw which is used for advancing the cutter, by a ratchet mechanism. Feed screws are notable for their power loss because of friction, while a ratchet will transmit a favorably high percentage of the power applied. Spiralling is also caused by twisting of the complete tool when the screw handle is turned. A ratchet or rack and pawl operates in line with rotation and therefore exerts no twisting force that will encourage spiraling.

Another important feature of my invention is the releasing of the ratchet for quick adjustment of the tool to fit various pipe sizes within the capacity of the tool. The racks and pawls are provided with a multiplicity of engaging parts to insure positive action and long service.

A further feature of the invention is the provision of a flat rest to insure accurate alignment of the cutter wheel and guide rollers when the cutter is supported by the rest bars commonly provided with power chucks.

Other objects and advantages will be more apparent from the following description wherein reference is had to the accompanying drawings, upon which:

Fig. 6 is a plan view of my improved pipe cutter, a portion of the handle being broken in the view;

Fig. 7 is a cross-sectional view through the ratchet mechanism thereof taken generally on the line 7—7 of Fig. 6;

Fig. 8 is a longitudinal sectional view taken generally on the line 8—8 of Fig. 6;

Fig. 9 is a fragmentary cross-sectional view through the ratchet mechanism taken generally on line 9—9 of Fig. 6;

Fig. 10 is a front perspective view of the ratchet mechanism assembly;

Fig. 11 is a side elevational view of a modified form of pipe cutter constructed in accordance with my invention;

Fig. 12 is a vertical cross-sectional view therethrough taken on the line 12—12 of Fig. 11;

Fig. 13 is a similar vertical sectional view therethrough taken on the line 13—13 of Fig. 11;

Fig. 14 is a fragmentary side elevational view of the pipe cutter with parts broken into section to more clearly show other parts;

Fig. 15 is a fragmentary plan view of the operating handle and associated pawl and Fig. 16 is a fragmentary sectional view showing one of the side ratchets and associated pawls, taken on the line 16—16 of Fig. 13.

Figure 1:
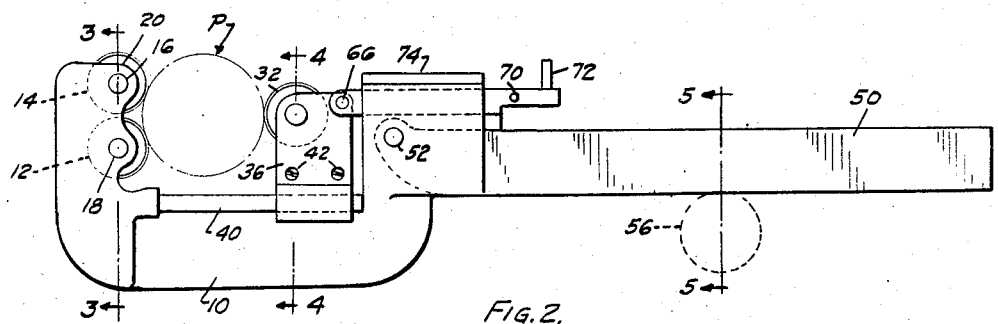
Fig. 1 is a side elevational view of a pipe cutter constructed in accordance with my invention.
Figure 2:
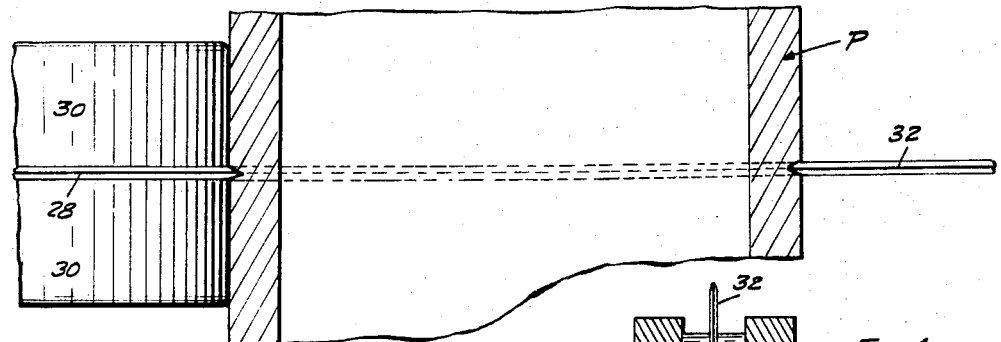
Fig. 2 is an enlarged plan sectional view showing the manner in which the improved guide rollers and tube or pipe cutter are aligned at the beginning of a cutting operation.
Figure 3:
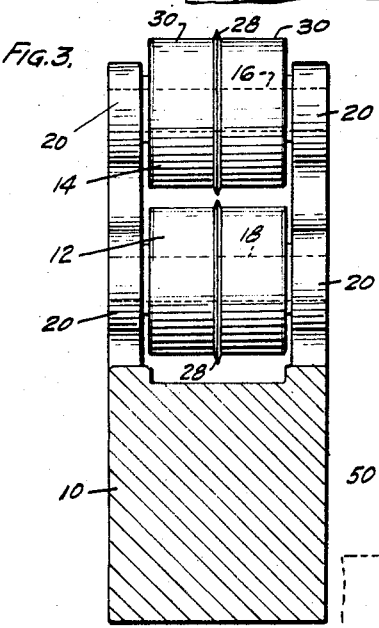
Fig. 3 is a vertical cross-sectional view through the guide rollers and supporting bracket taken on the line 3—3 of Fig. 1.
Figure 4:
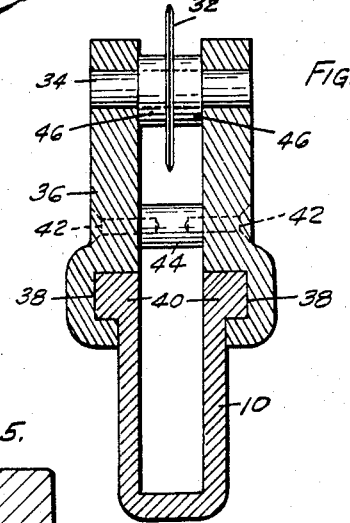
Fig. 4 is a vertical cross-sectional view through the cutter wheel and sliding block taken generally on the line 4—4 of Fig. 1.

In the embodiment of the invention which I have chosen to illustrate and describe the same, I have shown a pipe cutter of the guide wheel and roller type generally designed to operate on tubes, rods or pipes from approximately ¼ inch diameter to 2½ inches, it being understood of course that the same arrangement of parts may be employed for operation on larger pipe or tubing if desired.

The pipe cutter may include a frame 10 which has a pair of guide wheels or rollers 12 and 14 mounted upon stub shafts 16 and 18 journalled in suitable bearing portions 20 on both sides of the guide roller 14 and on both sides of the guide roller 12, the bearings being formed integral with the frame 10. The guide rollers 12 and 14 which are similar in shape and size, may be constructed with a medial blade or pointed disc portion 28 which extends between $\frac{1}{32}$ and $\frac{1}{16}$ inch beyond the circumferential edge of the roller portions 30 of each of the guide rollers.

The cutting wheel 32 is mounted upon a stub shaft 34 in the upper end of the sliding block 36, the block 36 being provided with guideways 38 to be slidably received upon the parallel guideways 40 of the frame 10. The sliding block, which may be made of two parts, is assembled together on the guideways and fastened by means of a pair of bolt members 42 and spacer 44. The cutter wheel 32 is also provided with shouldered spacers 46 upon opposite sides of the same so that when assembled together it is centrally located between the two side walls of the sliding block member 36.

In order to prevent spiraling on larger diameter pipe, as the cutting roller 32 is moved into engagement to commence cutting through the wall of the pipe P, it starts the formation of a cutting groove, and as the pipe is being rotated by the power driven chuck, the groove which has been started arrives at the pointed disc portions 28 of the guide rollers 12 and 14 so that the pointed disc portions enter the groove that has been formed, and in effect guide the rotation of the pipe so that no spiraling is possible, spiraling which could happen if there were no pointed disc portions 28 in the guide rollers 12 and 14. In addition, the burr which is formed by the starting of the cutting die or roller is thus effectively pressed down around the groove by the roller portions on both sides of the pointed disc portion of the guide rollers.

Figure 5:
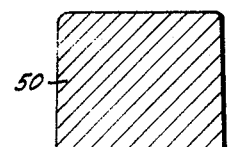
Fig. 5 is a vertical sectional view through the pipe cutter handle taken generally on the line 5—5 of Fig. 1.

The frame 10 is provided with a handle 50 connected thereto upon a pivot member 52 in the frame 10, the handle 50 being generally rectangular as shown in Fig. 5, and having a flat bottom 54 so that when the cutter is supported by the rest bars 56 commonly provided with power chucks, the tendency to bend the frame of the tool or to twist the same is largely prevented.

The sliding block 36 is adapted to be moved forward for a cutting operation by means of a ratchet mechanism which may include a central rack 60 and side racks 62 and 64 pivotally connected thereto on a pin member 66 connected through the side walls of the sliding block 36.

The rack 60 is provided on its lower surface with teeth 68 throughout the major portion of its length and is connected at its back end by means of a cross-rod 70 with the racks 62 and 64 for a purpose which will be later apparent. The rack 60 is also provided with an upstanding pin or handle 72 which, when there is forward movement of the rack mechanism, enters a guide slot 74 in the top plate 76 of the ratchet housing 78. A leaf spring 80 normally holds the rack 60 and the racks 62 and 64 in the work position shown in Fig. 8.

As best shown in Fig. 9, the racks 62 and 64 are provided with teeth or serrations 82 along the major extent of their lower surface. These teeth may be engaged by a pivotally mounted toothed dog 84, the dog being mounted upon the pivot 52 and normally held in the upright position shown in Fig. 9 by a compression spring 86 which holds the same against a stop member 88 in the ratchet housing 78. As best seen in Figs. 8 and 9, space is provided above the racks so that they may be raised by means of the handle 72 against a compression spring 90 mounted in the top plate 74 to disengage the racks from the toothed dogs 84.

The pipe cutter handle 50 is keyed to the pivot 52 and carries a ratchet member 92 at its forward end, the ratchet member being provided with a plurality of teeth 94 which engage the rack teeth 68 of the rack 60. For normally holding the teeth in engagement as shown in Fig. 8, I provide a compression spring 96 between the rack housing 78 and the handle 50.

When it is desired to perform a pipe cutting operation with the tool provided, the tool is applied to a pipe P as shown and the rack mechanism is moved forward, moving the sliding block 36 forward to engagement with the peripheral outer surface of the pipe. In this condition the handle 50 will be hanging down so that the teeth 94 on the ratchet 92 are not in engagement as yet with the teeth of the rack 60. By raising the handle 50 upwardly, the teeth 94 will engage the rack 60 and pressure will be applied so that as the pipe is rotated the cutting operation is commenced. The forward movement of the three racks will continue until the handle comes to rest against the shoulder 99 of the rack housing 78. For the next cut, and while the pipe to be cut is being continuously rotated by a power chuck, the handle 50 and the shoulder 99 on rack housing 78 will be automatically moved apart by the expansion of spring 96 for the next ratchet engagement, and the teeth 94 on the ratchet 92 engage the teeth of the rack 60 again to move the same forward through another distance or cutting operation. During the up and down movement of the handle 50 and the ratchet 92 the dogs 84 engage the racks 62 and 64 to maintain the forward movement of the cutter. This automatic feed will thus continue until the wall of the pipe has been cut through. When the pipe has been cut, the rack assembly may be quickly released by raising the same with the handle 72, disengaging the dogs 84 and the ratchet wheel 92, and the sliding block and ratchet assembly can then be pulled back to an open position ready to be applied for the next cutting operation.

In the embodiment of the invention which I have shown in Figs. 11 to 16 inclusive, I provide the pipe cutter frame 10a which has a pair of guide wheels or rollers 12a and 14a mounted upon stub shafts 16a and 18a in suitable bearing portions 20a formed integral with the frame 10a and provided upon both sides of the guide rollers 12a and 14a. The guide rollers are preferably similar in shape and size and provided with a medial blade or pointed disc portion 28a which extends between $\frac{1}{32}$ and $\frac{1}{16}$ inch beyond the circumferential edge of the roller portions 30a of each of the guide rollers.

The cutting wheel 32a may be mounted upon a stub shaft 35 which is mounted for rotation in suitable bores 37 in the sliding block 36a, the bore upon one side being elongated and the stub shaft 35 having a pair of flattened shoulders 39 positioned between a pair of adjusting screws 41 mounted in bosses 43 on the side wall of the sliding block 36a. With this adjusting means the cutting wheel 32a can be accurately adjusted to be in perfect alignment with the guide rollers 12a and 14a at all times.

The sliding block 36a is mounted for reciprocal movement upon the guideways 38a of the frame 10a in the customary manner. The guide rollers and the cutting wheel in operating upon a pipe, will function in the same manner as described in connection with the preferred form herein to prevent spiraling and to effectively eliminate burring during a pipe cutting operation.

The frame 10a may be provided with a handle 50a connected thereto upon a pivot member 53, the handle being generally rectangular and having a flat bottom 55 so that when the cutter is supported on the rest bars of a power chuck, the tendency to bend the frame of the tool or to twist the same is prevented.

The sliding block 36a is adapted to be moved forward automatically in a cutting operation by means of a ratchet and spring mechanism which may include a center rack 61 and a pair of side racks 63 and 65, all three of the racks being pivotally connected to the sliding block on a pin member 66a connected through the side walls of the sliding block 36a.

The three racks, which are generally similar in shape, are provided on their lower surfaces with ratchet teeth 67 through a major portion of their length, the medial rack 61 being engaged by a ratchet 69 pivotally mounted on a pin 71 carried by the handle 50a. A tapered depression 73 may be formed in the top of the handle 50a to receive the same and also to receive a coiled spring 75 which normally holds the ratchet in engagement with the teeth of the rack 61.

The frame housing 10b has a cover plate 78a over the entire width and length of the same, and the rack 61 is thus confined between the ratchet 69, the cover plate 78a, and a pair of vertical walls 77 and 79 formed in the housing 10b. The walls 77 and 79 also form bearings for the handle pivot 53, the handle at this point having a narrow forward end 50b (Fig. 15). The racks 63 and 65 may be confined between spaced parallel walls in a similar manner, the rack 63 being confined between the wall 77a and the side wall 81, and the rack 65 being confined between the side wall 79a and a side wall 83.

Each of the racks are engaged by a ratchet 85, the ratchets 85 being mounted upon pin members 87 connected between the side walls and normally in alignment with the pin member 71 in the handle 50a. The racks 63 and 65 are thus confined against the cover plate 78a, the racks being spring supported on shoulders 89 between the spaced parallel walls, a coiled spring 91 being provided for this purpose.

The two side racks 63 and 65 are also connected together by a U-shaped connector 91a below the lower edges of the vertical side walls 77a and 79a. The cover plate 78a is provided with a back extension 78b and a socket 78c to receive a compression spring 93 confined between the same and a socket 50c in the handle 50a.

In the normal operation of the cutter above described, the handle 50a may be raised against the spring 93 to advance the sliding block and cutter blade 32a against a pipe to be cut. This forward movement will bring all three racks forward and all three racks will be locked in the forward position by the ratchets 69 and 85. When the power unit which carries the pipe is started and the pipe is rotated in a clockwise direction, there is a vibration effected by the cutting of the metal which results in a slight tilting of the housing 10b as the pipe is rotating. This tilting action against the fixed handle results in an automatic constant forward feeding of the rack 61, and as a result the sliding block and cutting wheel are continuously moved forward until the cut has been accomplished. In this manner the feeding of the cutter wheel through the work is entirely automatic and is expeditiously and quickly accomplished.

When it is desired to retract or withdraw the cutting wheel to the position shown in Fig. 14, the handle 50a is lowered to a point where the edge of the same strikes the connector 91a, and continued downward movement of the handle 50a will carry both of the ratchets 85 down, disengaging the same from the teeth of the rack bars 63 and 65. Thus all three of the rack bars are disengaged and the sliding block may then be moved back to an open or starting position.

From the above description it can be seen that I have provided an improved pipe cutter which embodies certain important functions and features of construction heretofore not found in pipe cutters. The pointed disc portions of the guide wheels together with the provision of a handle with a flat bottom portion practically eliminate any twisting or bending of the frame and associated parts through which spiraling is caused. In addition, burrs which might be raised are leveled off as the cutting operation progresses, so that burring is also eliminated. By the use of the rack and ratchet mechanism shown it is a simple matter to automatically advance the cutter wheel throughout the cutting operation, and it is also a simple matter to withdraw the sliding block from the work so that it can be applied for the next cutting operation.

While I have shown and described a specific embodiment of the invention, it will be apparent to those skilled in the art that changes and modifications may be made in the exact details shown, and I do not wish to be limited in any particular; rather what I desire to secure and protect by Letters Patent of the United States is:

I claim:

1. A pipe cutter comprising a frame having a pair of vertically aligned guide rollers mounted for rotation in one end of the same, a pair of parallel horizontal guideways on said frame, a vertically disposed sliding block mounted on said guideways, a vertically disposed rotatable cutter carried by said sliding block, a rack and ratchet housing formed at one end of said frame, a rack mechanism slidably mounted therein and pivotally connected to said sliding block, a handle pivotally connected to said frame, and a ratchet carried by said handle for moving said rack and sliding block forward.

2. A pipe cutter comprising a frame having a pair of vertically aligned guide rollers mounted for rotation in one end of the same, a pair of parallel horizontal guideways on said frame, a vertically disposed sliding block mounted on said guideways, a vertically disposed rotatable cutter carried by said sliding block, a rack and ratchet housing formed at one end of said frame, a rack mechanism slidably mounted therein and pivotally connected to said sliding block, a handle pivotally connected to said frame, and a ratchet carried by said handle for moving said rack and sliding block forward, said rack comprising three aligned rack bars, and a pair of ratchet dogs mounted in said housing and engaging two of said rack bars.

3. A pipe cutter comprising a frame having a pair of vertically aligned guide rollers mounted for rotation in one end of the same, a pair of parallel horizontal guideways on said frame, a vertically disposed sliding block mounted on said guideways, a vertically disposed rotatable cutter carried by said sliding block, a rack and ratchet housing formed at one end of said frame, a rack mechanism slidably mounted therein and pivotally connected to said sliding block, a handle pivotally connected to said frame, a ratchet carried by said handle for moving said rack and sliding block forward, said rack comprising three aligned rack bars, and a pair of ratchet dogs mounted in said housing and engaging two of said rack bars, said rack bars all being connected for back and forth movement together.

4. A pipe cutter comprising a frame having a pair of vertically aligned guide rollers mounted for rotation in one end of the same, a pair of parallel horizontal guideways on said frame, a vertically disposed sliding block mounted on said guideways, a vertically disposed rotatable cutter carried by said sliding block, a rack and ratchet housing formed at one end of said frame, a rack mechanism slidably mounted therein and pivotally connected to said sliding block, a handle pivotally connected to said frame, a ratchet carried by said handle for moving said rack and sliding block forward, said rack comprising three aligned rack bars, and a pair of ratchet dogs mounted in said housing and engaging two of said rack bars, said rack bars all being connected for back and forth movement together, and a handle on one of said rack bars for moving the same together.

5. A pipe cutter comprising a frame having a plurality of vertically disposed guide rollers mounted for rotation in the front end of the same, each of said rollers having a medial blade portion, a pair of horizontal parallel guide tracks on said frame, a vertically disposed sliding block mounted on said guide tracks, a vertically disposed rotatable cutter blade carried by said sliding block, said cutter blade disposed medially between said guide rollers, a rack and ratchet housing formed at the back end of said frame, a plurality of horizontally disposed and aligned rack bars mounted in said housing, all of said rack bars connected to said sliding block at one end, a member connecting said rack bars at the other end, said rack bars all having teeth on their lower surface, ratchet dogs in said housing engaging all but one of said rack bars, a handle connected to said frame, a ratchet secured thereto and engaging the rack bar not engaged by said ratchet dogs.

6. A pipe cutter comprising a frame having a plurality of vertically disposed guide rollers mounted for rotation in the front end of the same, each of said rollers having a medial blade portion, a pair of horizontal parallel guide tracks on said frame, a vertically disposed sliding block mounted on said guide tracks, a vertically disposed rotatable cutter blade carried by said sliding block, said cutter blade disposed medially between said guide rollers, a rack and ratchet housing formed at the back end of said frame, a plurality of horizontally disposed and aligned rack bars mounted in said housing, all of said rack bars connected to said sliding block at one end, a member connecting said rack bars at the other end, said rack bars all having teeth on their lower surface, ratchet dogs in said housing engaging all but one of said rack bars, a handle connected to said frame, a ratchet secured thereto and engaging the rack bar not engaged by said ratchet dogs, said rack bars capable of disengagement from said ratchet dogs and ratchet for movement in unison.

7. A pipe cutter for cutting a revolving pipe carried in a power chuck, said cutter comprising a frame having one or more guide rollers mounted for rotation in one end of the same, a guideway on said frame, a sliding block mounted on said guideway, a rotatable cutter carried by said block, said revolving pipe being located between said guide rollers and said cutter, a rack pivotally connected to said block, a handle pivotally mounted in said frame and supported adjacent its end upon the rest bar of the power chuck, a ratchet wheel connected to said handle at its pivot, spring means in said frame holding said rack in yielding engagement with said ratchet wheel, and spring means between said handle and said frame normally urging said handle and said frame apart, whereby when said work piece is rotated in a clockwise direction there is a vibration resulting in a rocking of the frame as the pipe is rotating, thus effecting a continuous forward feed between the ratchet wheel at the handle pivot and said rack.

8. A pipe cutter for cutting a revolving pipe carried in a power chuck, said cutter comprising a frame having one or more guide rollers mounted for rotation in one end of the same, a guideway on said frame, a sliding block mounted on said guideway, a rotatable cutter carried by said block, said revolving pipe being located between said guide rollers and said cutter, a rack pivotally connected to said block, a handle pivotally mounted in said frame and supported adjacent its end upon the rest bar of the power chuck, a ratchet wheel connected to said handle at its pivot, spring means in said frame holding said rack in yielding engagement with said ratchet wheel, and spring means between said handle and said frame normally urging said handle and said frame apart, whereby when said work piece is rotated in a clockwise direction there is a vibration resulting in a rocking of the frame as the pipe is rotating, thus effecting a continuous forward feed between the ratchet wheel at the handle pivot and said rack, one or more holding racks and ratchets mounted in said frame.

9. A pipe cutter for cutting a revolving pipe carried in a power chuck, said cutter comprising a frame having one or more guide rollers mounted for rotation in one end of the same, a guideway on said frame, a sliding block mounted on said guideway, a rotatable cutter carried by said block, said revolving pipe being located between said guide rollers and said cutter, a rack pivotally connected to said block, a handle pivotally mounted in said frame and supported adjacent its end upon the rest bar of the power chuck, a ratchet wheel connected to said handle at its pivot, spring means in said frame holding said rack in yielding engagement with said ratchet wheel, and spring means between said handle and said frame normally urging said handle and said frame apart, whereby when said work piece is rotated in a clockwise direction there is a vibration resulting in a rocking of the frame as the pipe is rotating, thus effecting a continuous forward feed between the ratchet wheel at the handle pivot and said rack, one or more holding racks and ratchets mounted in said frame and means associated therewith for releasing the same by movement of said handle.

10. A pipe cutter for cutting a revolving pipe carried in a power chuck, said cutter comprising a frame having one or more guide rollers mounted for rotation in one end of the same, a guideway on said frame, a sliding block mounted on said guideway, a rotatable cutter carried by said block, said revolving pipe being located between said guide rollers and said cutter, a rack pivotally connected to said block, a handle pivotally mounted in said frame and supported adjacent its end upon the rest bar of the power chuck, a ratchet wheel connected to said handle at its pivot, spring means in said frame holding said rack in yielding engagement with said ratchet wheel, and spring means between said handle and said frame normally urging said handle and said frame apart, whereby when said work piece is rotated in a clockwise direction there is a vibration resulting in a rocking of the frame as the pipe is rotating, thus effecting a continuous forward feed between the ratchet wheel at the handle pivot and said rack, one or more holding racks and ratchets mounted in said frame and means associated therewith for releasing the same, said means comprising a pin member on one of said racks.

11. A pipe cutter for cutting a revolving pipe carried in a power chuck, said cutter comprising a frame having one or more guide rollers mounted for rotation in one end of the same, a guideway on said frame, a sliding block mounted on said guideway, a rotatable cutter carried by said block, said revolving pipe being located between said guide rollers and said cutter, a rack pivotally connected to said block, a handle pivotally mounted in said frame and supported adjacent its end upon the rest bar of the power chuck, a ratchet wheel connected to said handle at its pivot, spring means in said frame holding said rack in yielding engagement with said ratchet wheel, and spring means between said handle and said frame normally urging said handle and said frame apart, whereby when said work piece is rotated in a clockwise direction there is a vibration resulting in a rocking of the frame as the pipe is rotating, thus effecting a continuous forward feed between the ratchet wheel at the handle pivot and said rack, one or more holding racks and ratchets mounted in said frame and means associated therewith for releasing the same, said means comprising a pin member on one of said racks, said first named rack and said holding racks being pinned together at their outer ends to move in unison.

12. A pipe cutter comprising a frame having a pair of vertically aligned guide rollers mounted for rotation in one end of the same, a pair of parallel horizontal guideways on said frame, a vertically disposed sliding block mounted on said guideways, a vertically disposed rotatable cutter carried by said sliding block, a rack and ratchet housing formed at one end of said frame, a rack mechanism slidably mounted therein and pivotally connected to said sliding block, a handle pivotally connected to said frame, and a ratchet carried by said handle for moving said rack and sliding block forward, said rack comprising three aligned rack bars, and a pair of ratchet dogs mounted in said housing and engaging two of said rack bars, said ratchet dogs connected together and released from engagement with said rack bar by downward movement of said handle.

References Cited in the file of this patent

UNITED STATES PATENTS

| 186,099 | Barnes | Jan. 9, 1877 |
| 426,171 | Comstock | Apr. 22, 1890 |
| 468,601 | Gorsuch | Feb. 9, 1892 |
| 951,367 | Ducharme | Mar. 8, 1910 |
| 1,077,951 | Beck | Nov. 4, 1913 |
| 1,469,472 | Bangert | Oct. 2, 1923 |
| 1,484,023 | Hayter | Feb. 19, 1924 |
| 1,679,321 | McKay | July 31, 1928 |
| 1,814,763 | Neubauer | July 14, 1931 |
| 2,230,030 | Finch | Jan. 28, 1941 |
| 2,502,700 | Capewell | Apr. 4, 1950 |

FOREIGN PATENTS

| 7,869 | Great Britain | 1893 |
| 70,989 | Germany | Sept. 18, 1893 |